UNITED STATES PATENT OFFICE.

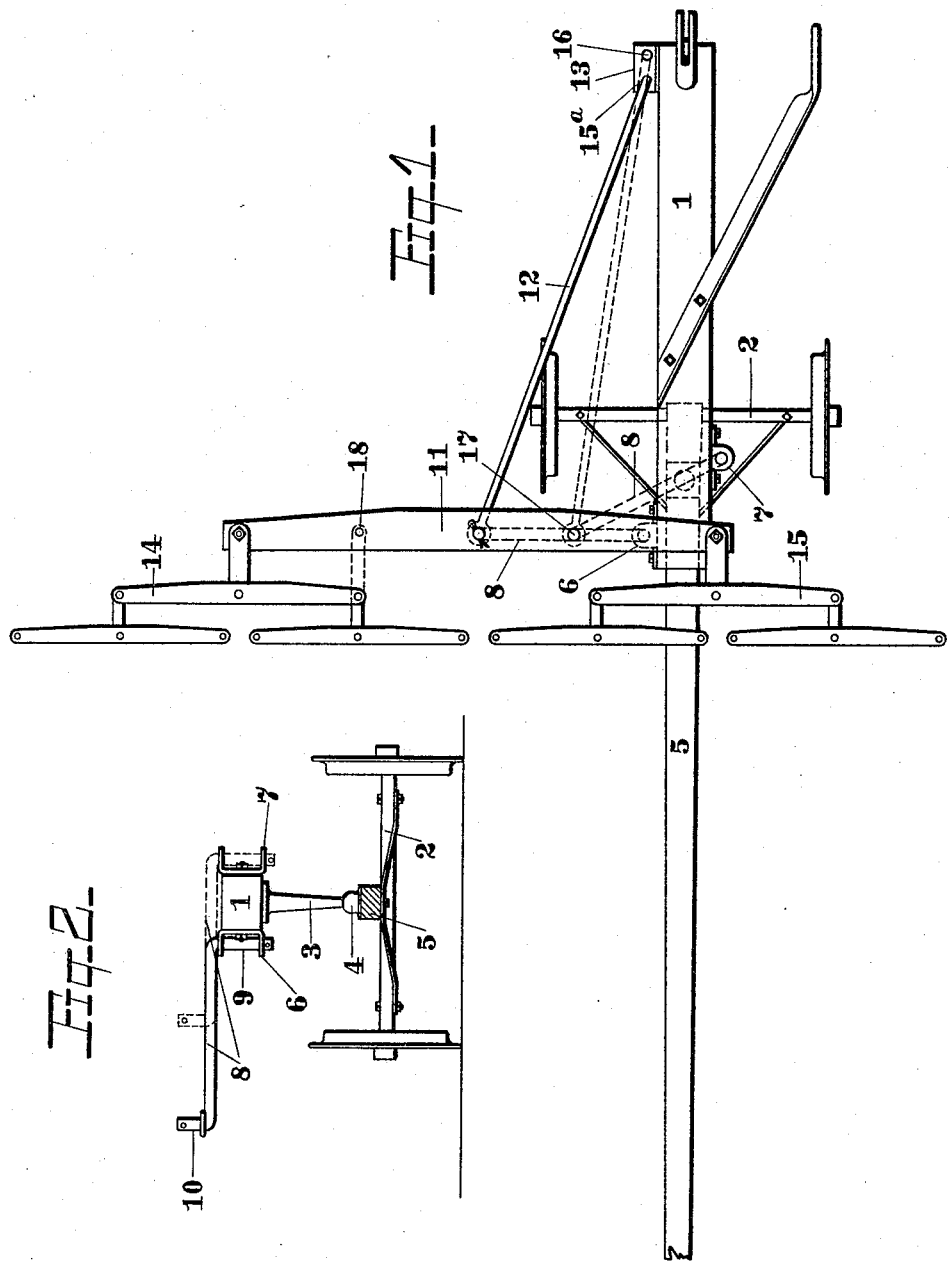

JOSEPH DAIN, OF MOLINE, ILLINOIS, ASSIGNOR TO DEERE & COMPANY, OF MOLINE, ILLINOIS, A CORPORATION OF ILLINOIS.

DRAFT DEVICE.

1,152,936.  Specification of Letters Patent.  Patented Sept. 7, 1915.

Application filed December 23, 1913. Serial No. 808,350.

*To all whom it may concern:*

Be it known that I, JOSEPH DAIN, a citizen of the United States, residing at Moline, in the county of Rock Island and State of Illinois, have invented certain new and useful Improvements in Draft Devices, of which the following is a specification, reference being had therein to the accompanying drawing.

My invention relates to draft devices to be used with certain agricultural machines, particularly where it is desired to change the number of horses employed, and my invention has for its object to make such change more readily, and to simplify the mechanism.

Referring to the drawings in which similar numerals indicate identical parts—Figure 1 is a plan view of a truck supporting a tongue to which my invention is shown applied, and Fig. 2 is a detail end view.

An ordinary stub tongue 1, such as usually employed on harvesters and other machines, is supported on a truck 2 by a standard 3 secured rigidly to the stub tongue and having its lower end freely revoluble in a member 4 secured on a tongue 5 to which the truck 1 is firmly secured in any suitable manner.

On the stub tongue 1 and near the forward end thereof, I mount vertical bearings 6 and 7, preferably one in advance of the other and on opposite sides of the stub tongue; the bearings 6 and 7 may be made solid but I prefer the channel construction shown as being equally effective and more economical. A horizontally disposed arm 8 having an end 9 bent downwardly and supported in the bearing 6, extends laterally from the stub tongue 1 and has its remaining end 10 bent upwardly to form a pivot upon which an equalizer bar 11 is supported. A draft rod 12 is connected to the end 10 of the arm 8 and also to a member 13 secured on the rear end of the stub tongue 1.

As shown my device is arranged for four horses, having doubletrees 14 and 15 attached to each end of the equalizer bar 11, the latter being pivoted centrally on the arm 8; when it is desired to employ three horses, the equalizer bar 11 is raised from the end 10 of the arm 8, the latter is then disengaged from the bearing 6, the end 9 being inserted in the bearing 7, and the draft rod 12, the forward end of which is connected with the end 10 of the arm 8, is adjusted rearwardly by removing it from a hole 15$^a$ in the member 13 and connecting it with a hole 16, the equalizer bar 11 is then replaced upon the vertical part 10 of the arm 8 through a hole 17, and is again in operative condition occupying the same position with respect to the tongue as when used for four horses. The doubletree 14 is then removed from the equalizer bar 11, and a swingletree connected to the latter by a pin or bolt in a hole 18 as indicated in dotted lines Fig. 1; my device is thus quickly arranged for a three horse draft, and is as readily rearranged for four horses.

What I claim is—

1. The combination of a tongue, a plurality of bearings on the tongue, an arm supported in one bearing and movable to another, and an equalizer pivoted on the arm, the pivotal relation of the equalizer and the arm adapted to be changed when said arm is moved to another bearing.

2. The combination of a tongue, two bearings one on each side of the tongue, an arm supported in the bearing on one side of the tongue and movable to the other bearing on the opposite side of the tongue, and an equalizer pivoted on the arm, the pivotal relation of the equalizer and the arm adapted to be changed when said arm is moved to the other bearing.

3. The combination of a tongue, a bearing on one side of the tongue, a bearing on the opposite side of the tongue rearward of the first bearing, an arm supported in one bearing and movable to the other, and an equalizer pivoted on the arm, the pivotal relation of the equalizer and the arm adapted to be changed when said arm is moved to the other bearing.

4. The combination of a tongue, a plurality of bearings on the tongue, an arm supported in one bearing and movable to another, an equalizer pivoted on the arm, the pivotal relation of the equalizer and the arm adapted to be changed when the latter is moved to the other bearing, a draft rod connected to said pivot and to the tongue, and adapted to be adjusted with the arm when the latter is moved.

5. The combination of a tongue, a bearing on one side of the tongue, a bearing on the opposite side of the tongue, an arm having one end bent downwardly to engage with a bearing on one side of the tongue and movable to the bearing on the opposite side of the tongue, the other end of said arm bent upwardly to form a pivot and an equalizer having two holes with one of which said pivot engages, said pivot adapted to be transposed to the other hole when the downwardly bent end of the arm is moved to another bearing.

6. The combination of a tongue, a bearing on one side of the tongue, a bearing on the opposite side of the tongue, an arm having one end bent downwardly to engage with either of said bearings, the other end of said arm bent upwardly to form a pivot, an equalizer supported on said pivot, and a draft-rod connected to the pivotal end of said arm and rearwardly connected to the tongue.

7. The combination of a tongue, a bearing on one side of the tongue, a bearing on the opposite side of the tongue, an arm having one end bent to engage with either of said bearings, the opposite end of said arm bent to form a pivot, an equalizer supported on said pivot, and a draft rod connected to the pivotal end of said arm and rearwardly connected to the tongue.

In testimony whereof I affix my signature, in presence of two witnesses.

JOSEPH DAIN.

Witnesses:
BERTHA MAURER,
JESSIE L. SIMSER.

Copies of this patent may be obtained for five cents each, by addressing the "Commissioner of Patents, Washington, D. C."